(12) United States Patent
Bonner

(10) Patent No.: US 7,360,470 B2
(45) Date of Patent: Apr. 22, 2008

(54) BICYCLE CRANK AND ASSOCIATED METHODS

(75) Inventor: Ronald J. Bonner, Maitland, FL (US)

(73) Assignee: American Mentality, Inc., Longwood, FL (US)

( * ) Notice: Subject to any disclaimer, the term of this patent is extended or adjusted under 35 U.S.C. 154(b) by 13 days.

(21) Appl. No.: 11/368,340

(22) Filed: Mar. 3, 2006

(65) Prior Publication Data

US 2006/0236808 A1 Oct. 26, 2006

Related U.S. Application Data

(60) Provisional application No. 60/658,496, filed on Mar. 4, 2005.

(51) Int. Cl.
*G05G 1/14* (2006.01)
(52) U.S. Cl. ............ 74/594.1; 74/594.2; 74/588
(58) Field of Classification Search ........... 74/594.1, 74/594.2, 588; D12/123; 29/428; *B62M 3/16, B62M 3/00*
See application file for complete search history.

(56) References Cited

U.S. PATENT DOCUMENTS

| | | | | |
|---|---|---|---|---|
| 2,350,468 | A | * 6/1944 | Kraeft | 74/594.1 |
| 5,165,306 | A | * 11/1992 | Hellon | 74/588 |
| 5,609,070 | A | * 3/1997 | Lin et al. | 74/594.1 |
| D401,539 | S | * 11/1998 | Humphries et al. | D12/123 |
| 2006/0101940 | A1* | 5/2006 | Okada | 74/594.1 |

FOREIGN PATENT DOCUMENTS

| JP | 2006-143189 | * 6/2006 |
|---|---|---|
| WO | WO 2005/068284 A1 | * 7/2005 |

OTHER PUBLICATIONS

Cobalt SL, product information, [online], [retrieved on Apr. 11, 2007], Retrieved from the Crank Brothers website using Internet <URL:http://www.crankbrothers.com>, acknowledged prior art.
Cook Brother's Cranks, product information, [online], [retrieved on May 2, 2006], Retrieved from the Bike Pro website using Internet <URL:http://www.bikepro.com/products/cranks/cooks/html>, acknowledged prior art.

* cited by examiner

*Primary Examiner*—Vinh T. Luong
(74) *Attorney, Agent, or Firm*—Allen, Dyer, Doppelt, Milbrath & Gilchrist, P.A.

(57) ABSTRACT

A bicycle crank comprises a mixture of aluminum and chromoly. The spine comprises chromoly, which serves as a backbone to the crank arm and thereby provides added strength. The body comprises aluminum, which reduces the crank arm weight. The body can therefore be thinner and lighter with the added support provided by the steel spine. In another embodiment the crank arm includes a spine having a crank boss and a spindle boss at opposed ends that are integrally formed with the crank arm. An outer shell includes an elongated member having an inner face having an outer perimeter with a shape approximately coincident with an outer perimeter of the spine The inner face is recessed to admit a portion of the spine and has crank and spindle boss apertures extending through to an outer face. The outer perimeters of the outer shell and the spine are joined together.

7 Claims, 6 Drawing Sheets

BICYCLE CRANK AND ASSOCIATED METHODS

CROSS-REFERENCE TO RELATED APPLICATION

This application claims priority to provisional patent application Ser. No. 60/658,496, filed Mar. 4, 2005, entitled "Bicycle Crank and Associated Methods."

BACKGROUND OF THE INVENTION

1. Field of the Invention

The present invention relates to bicycle cranks, and, more particularly, to such a bicycle crank that has improved strength and lower weight.

2. Description of Related Art

Bicycle cranks known in the art comprise either aluminum or chromoly (a steel alloy). Since aluminum is not strong, larger, thicker cranks are required; chromoly cranks must be welded, leaving a joint more vulnerable to breakage.

Therefore, it would be advantageous to provide a bicycle crank without welds but lighter and thinner than currently known cranks.

Crank arms known in the art are also typically folded over and welded on the ends from the top and back sides of the crank arms 90, as shown in FIGS. 1 and 2. The welding areas 91-96 are shown as thickened lines. Because of this amount of welding, the crank arm 90 is heated excessively, creating weak points 97,98 in the arm 90, as shown by the vertical lines.

Therefore, it would also be beneficial to provide a crank arm that is subjected to less stress during the welding process by reducing the amount of welding required.

SUMMARY OF THE INVENTION

A bicycle crank is provided that comprises a mixture of aluminum and chromoly.

In another embodiment the crank arm includes a spine having a crank boss and a spindle boss at opposed ends that are integrally formed with the crank arm. An outer shell includes an elongated member having an inner face having an outer perimeter with a shape approximately coincident with an outer perimeter of the spine The inner face is recessed to admit a portion of the spine and has crank and spindle boss apertures extending through to an outer face. The outer perimeters of the outer shell and the spine are joined together.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
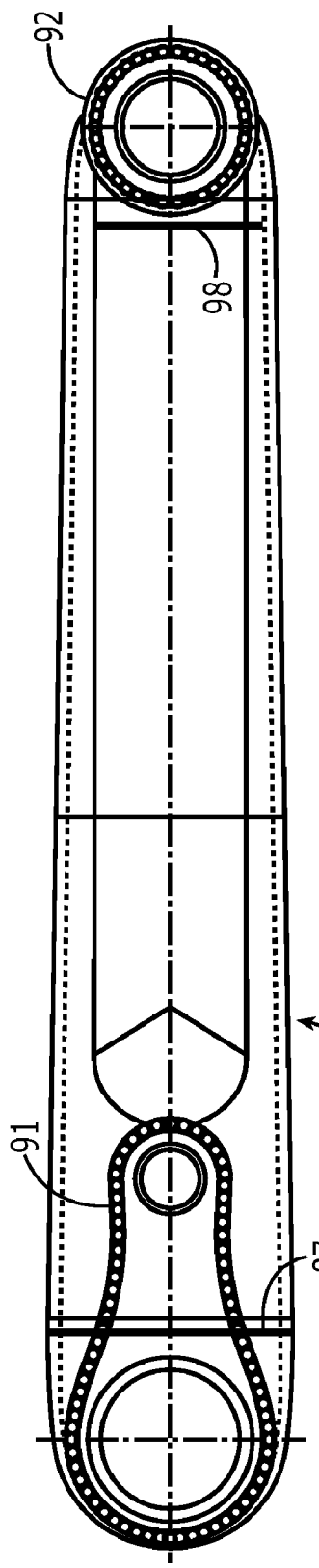
FIGS. 1 and 2 (prior art) are top and side views, respectively, of prior art crank arms.

A description of the preferred embodiments of the present invention will now be presented with reference to FIGS. 3-19.

The present construction of an embodiment of a bicycle crank 10 (FIGS. 3-11) comprises a mixture of aluminum and chromoly. The spine 11 comprises chromoly, which serves as a backbone to the crank arm 10 and thereby provides added strength. The body 12 comprises aluminum, which reduces the crank arm weight. The body 12 can therefore be thinner and lighter with the added support provided by the steel spine 11.

The spine 11 comprises an elongated, substantially planar member 100 having a crank boss hole 101 and a spindle boss hole 102 extending from an inner face 103 through to an outer face 104 thereof adjacent opposed ends 105,106 of the planar member 100. The spine 11 further comprises a crank boss 107 and a spindle boss 108 at the opposed ends 105,106 of the planar member 100 that protrude from the inner face 103. The crank boss 107 and the spindle boss 108 are integrally formed with the elongated member 100, and each comprise a substantially cylindrical element having a lumen 109,110 in communication with the respective crank boss hole 101 and spindle boss hole 102.

The spline 13 on the inside of the spindle boss 14 lumen 110 comprises a 48-tooth spline, which at the time of writing is the most common spline system for BMX cranks. The spline 13 attaches the crank arm 10 to the axle, allowing it to spline with the bearing in the bottom bracket, which in turn attaches to the frame.

The outer body 12 comprises an elongated member 120 that has an inner face 121 having an outer perimeter 122 with a shape approximately coincident with an outer perimeter 111 of the spine's planar member 100. The inner face 121 is recessed and dimensioned to admit at least a portion of the spine 11 and has a crank boss aperture 123 extending from the inner face 121 through to an outer face 125 at a first end 126 dimensioned to admit the crank boss 107. A spindle boss aperture 127 extends from the inner face 121 through to the outer face 125 at a second end 128 opposed to the first end 126 dimensioned to admit the spindle boss 108.

The crank boss 107 and the spindle boss 108 each have an axial dimension longer than a respective axial dimension of the crank boss aperture 123 and the spindle boss aperture 127. This respective dimension permits a portion 128,129 of each of the crank boss 107 and the spindle boss 108 to protrude beyond the crank boss aperture 123 and spindle boss aperture 127 when assembled together.

Since aluminum cannot be welded to steel, the two metals are attached using nuts 15,16 at the pedal 17 and spindle 14 boss areas. The nuts are recessed into the back of the body 12. In an alternate embodiment, a sealant such as glue 140,141 may also be used to reinforce the mating of the two metals.

The present crank construction is lighter than any known aluminum crank, and is at least as light as known chromoly cranks. The crank 10 of this first embodiment further has no welds, offering greater strength and durability. Therefore, the crank 10 of the present invention is believed to provide improved strength and performance over prior art bicycle cranks.

Figure 2:
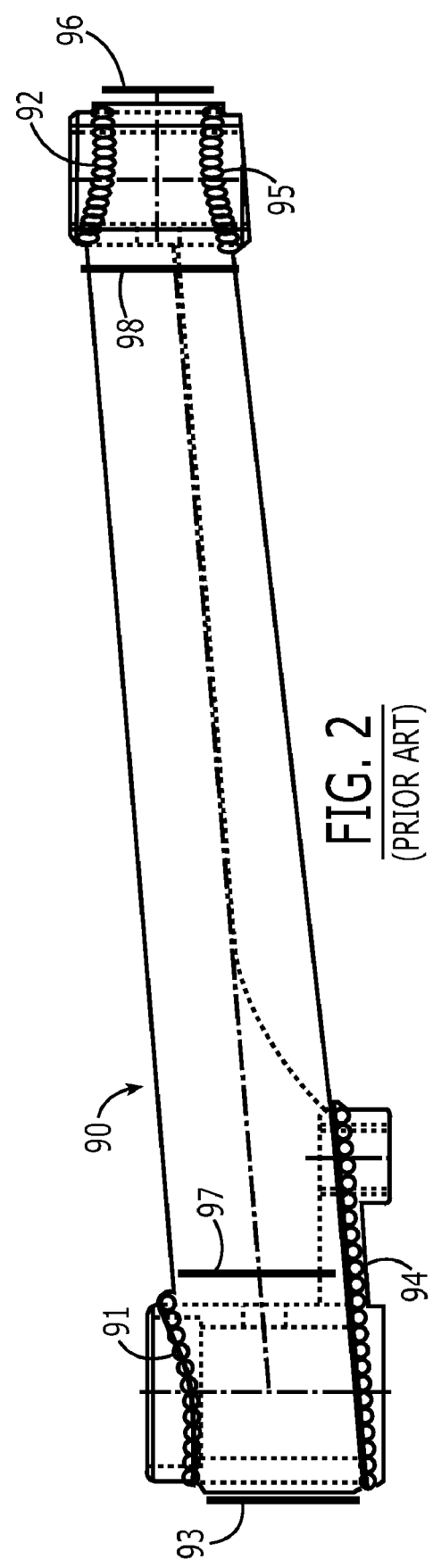
Figure 3:
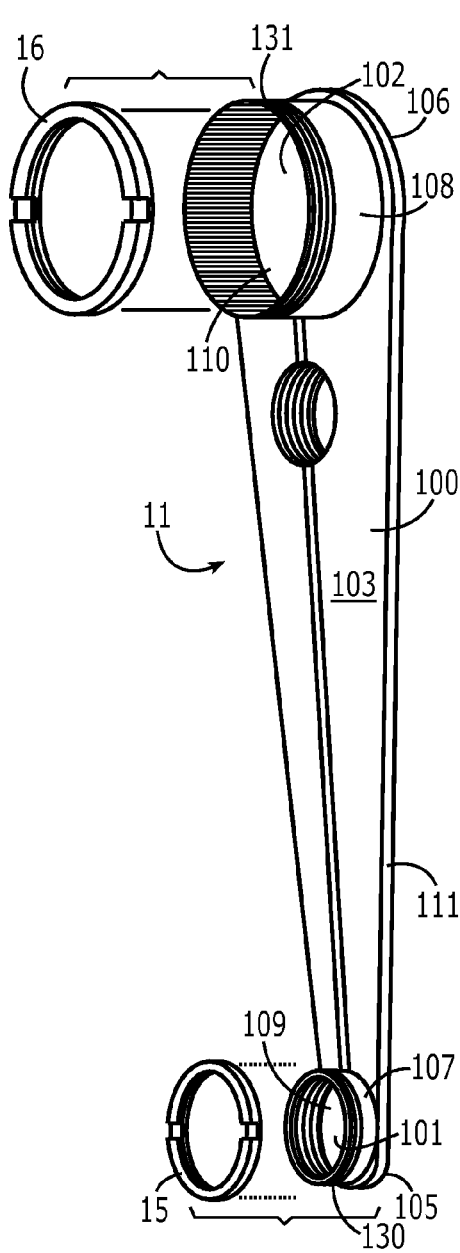
FIGS. 3-5 illustrate the spine body detail in an embodiment of the bicycle crank of the present invention, with FIG. 3 representing an inside view of the spine, FIG. 4, an outside view of the spine, and FIG. 5, an inside view of the body.
Figure 4:
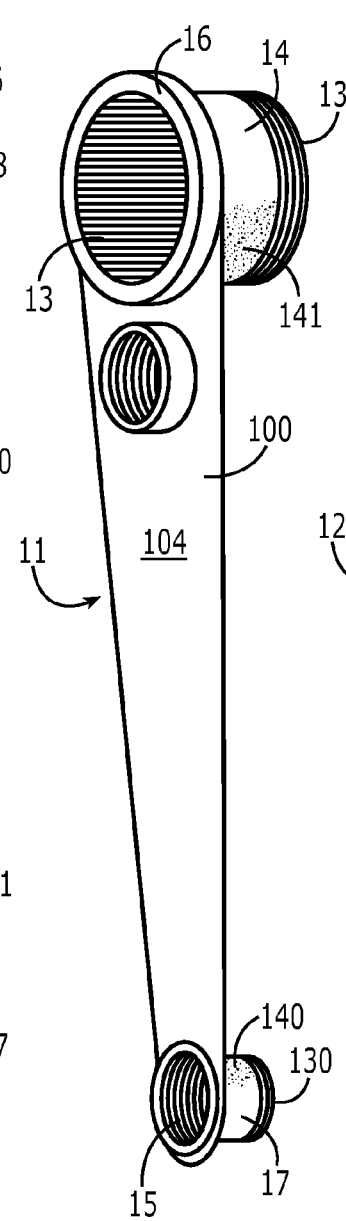
Figure 5:
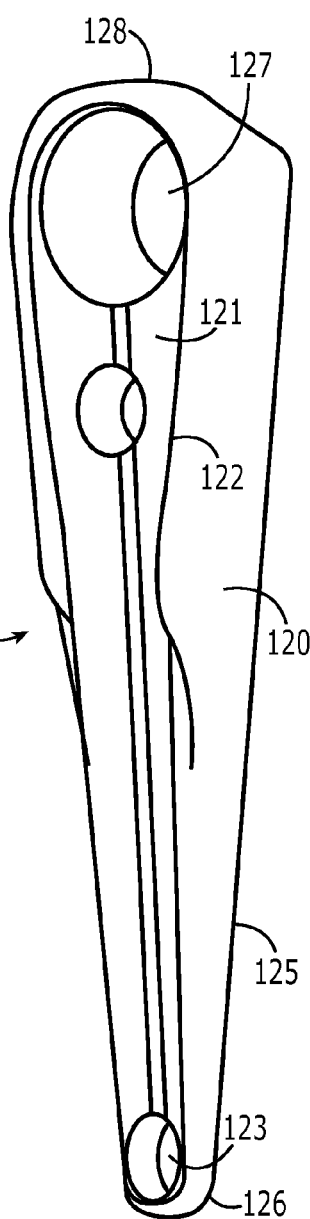
Figure 6:
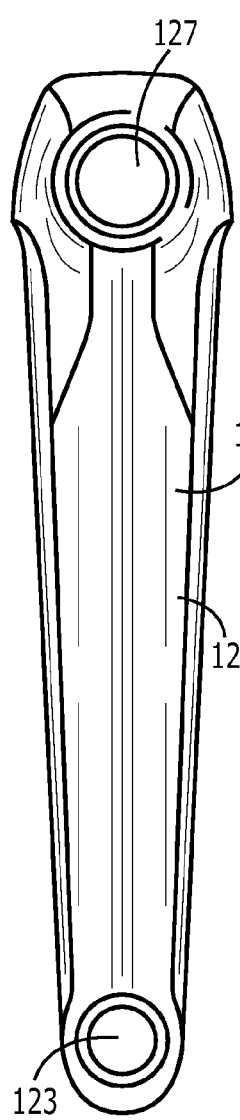
FIGS. 6-9 illustrate the body exterior design, with FIGS. 6 and 8 representing an inside view and FIGS. 7 and 9, a side view. The shading in FIGS. 8 and 9 represents machined areas.
Figure 7:
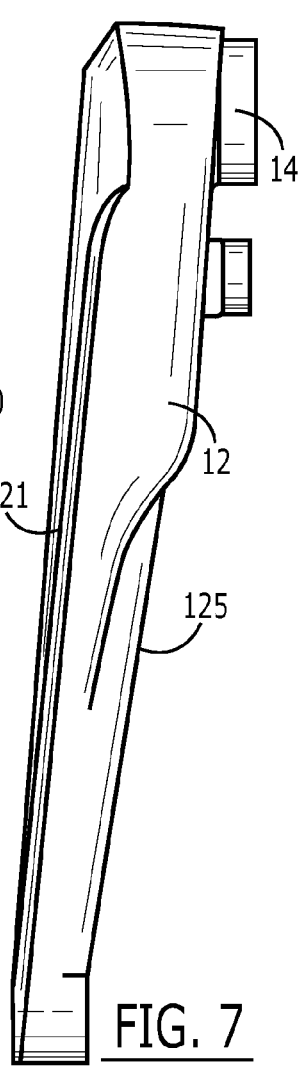
Figure 8:
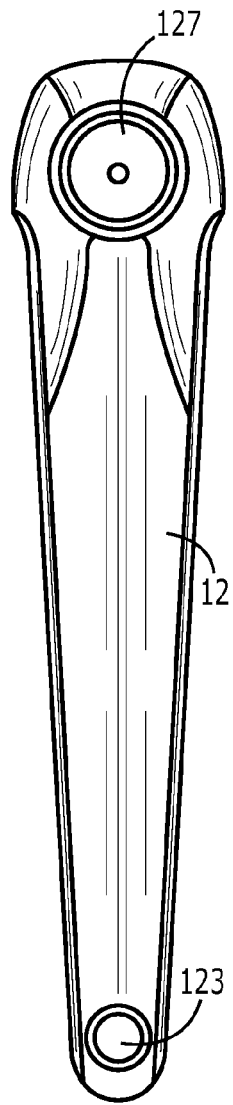
Figure 9:
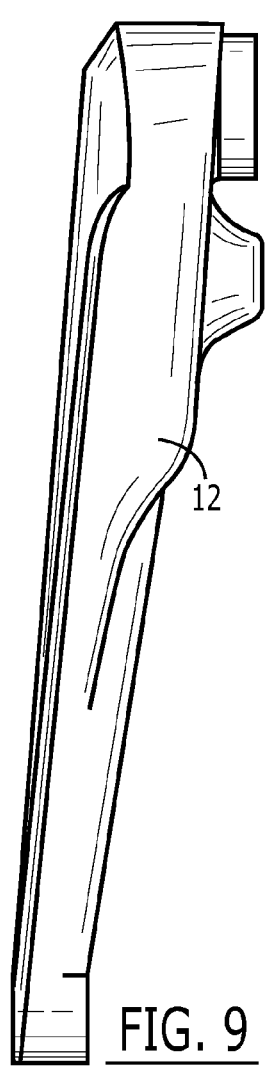
Figure 10:
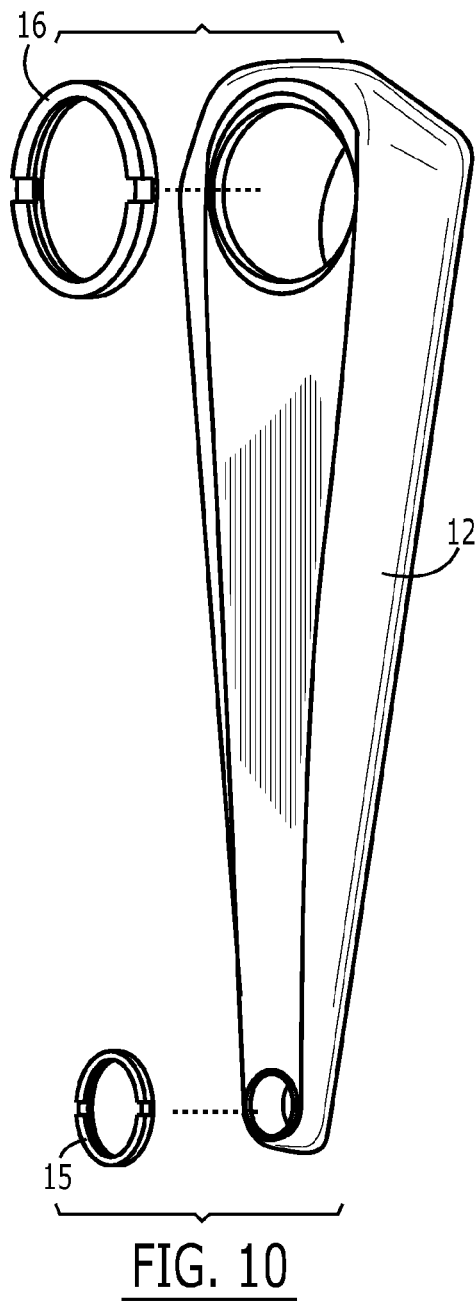
FIGS. 10 and 11 illustrate the spine and body assembly, with FIG. 10 showing the nuts being placed on the outside of the body, and FIG. 11 showing the spine being placed into the body.
Figure 11:
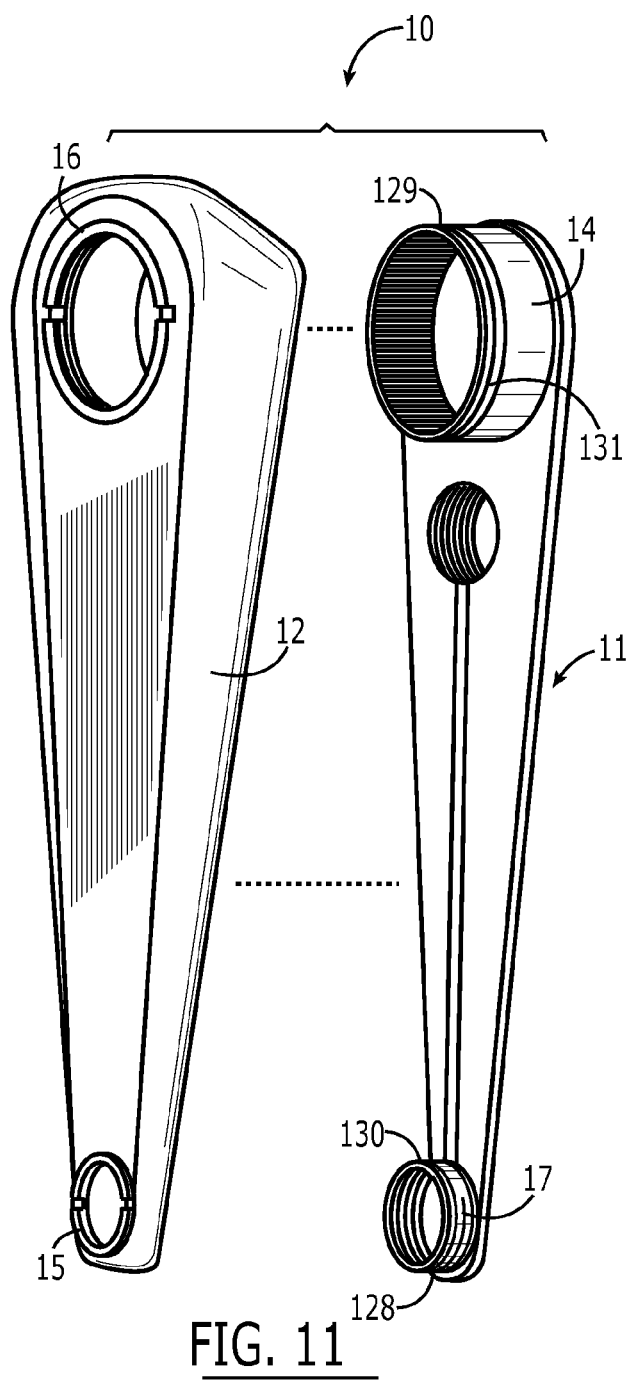
Figure 12:
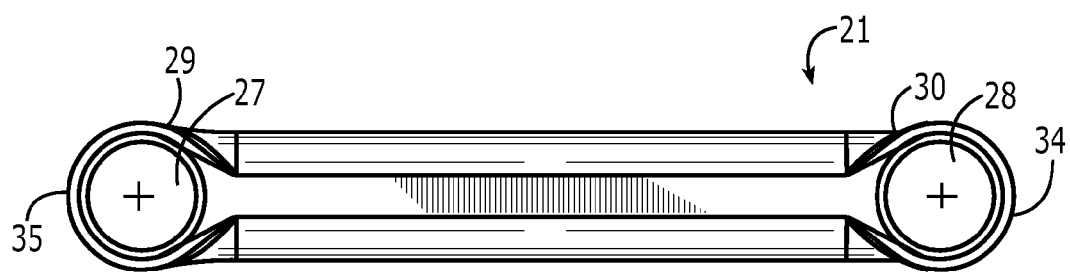
FIGS. 12 and 13 are outside and side perspective views, respectively, of the outside shell of another embodiment of the crank arm.
Figure 13:
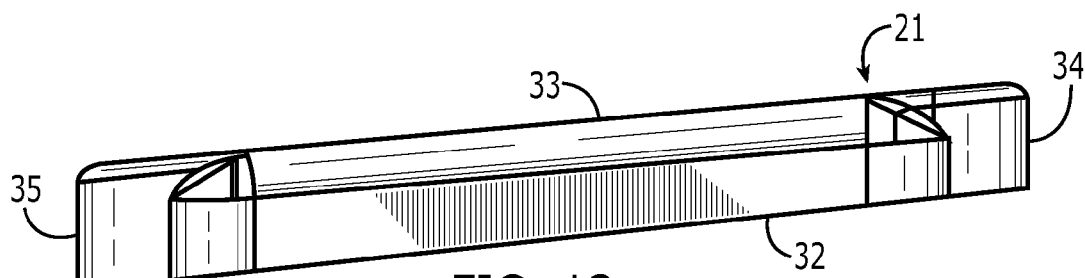
Figure 14:
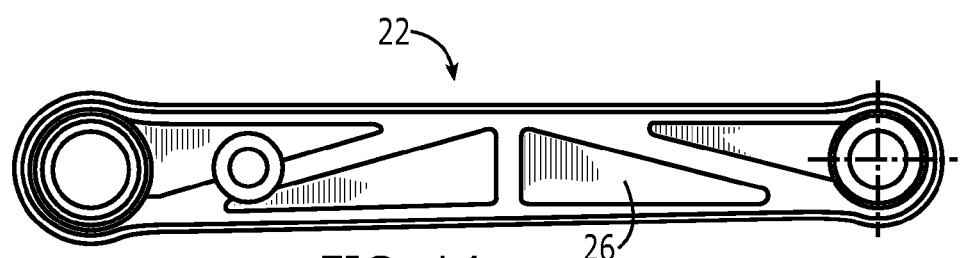
FIGS. 14-17 are inside, side perspective, side, and outside views, respectively, of a spine of the crank arm.
Figure 15:
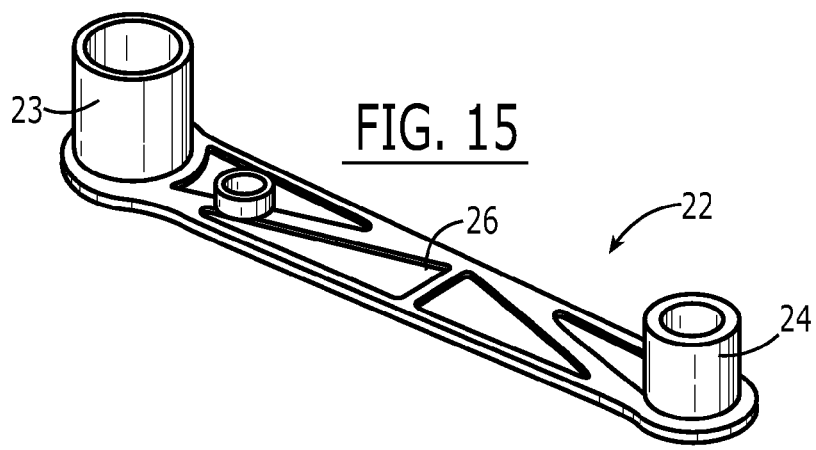
Figure 16:
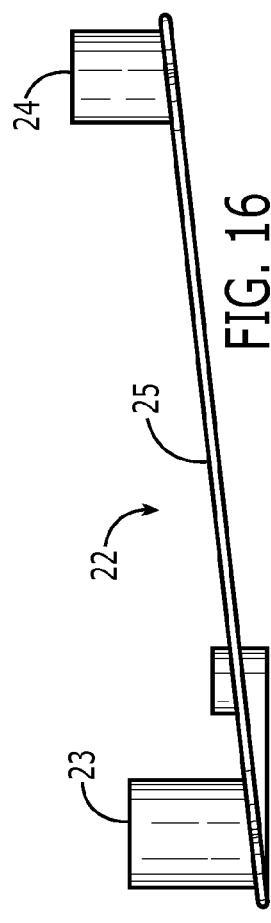
Figure 17:
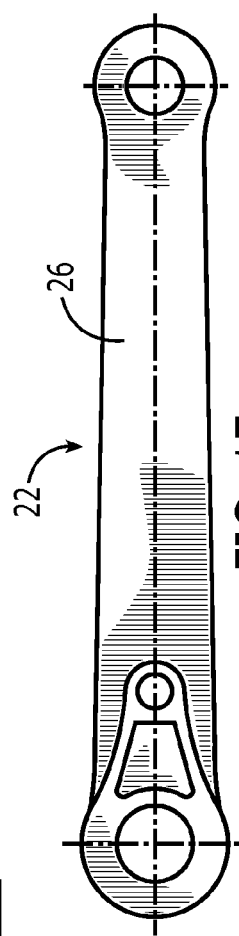
Figure 18:
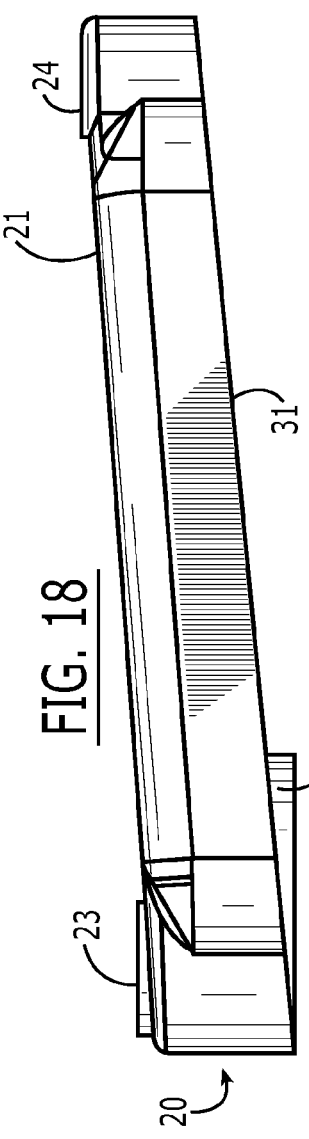
FIGS. 18 and 19 are side and inside views, respectively, of the assembled crank arm formed by the elements of FIGS. 12-17.
Figure 19:
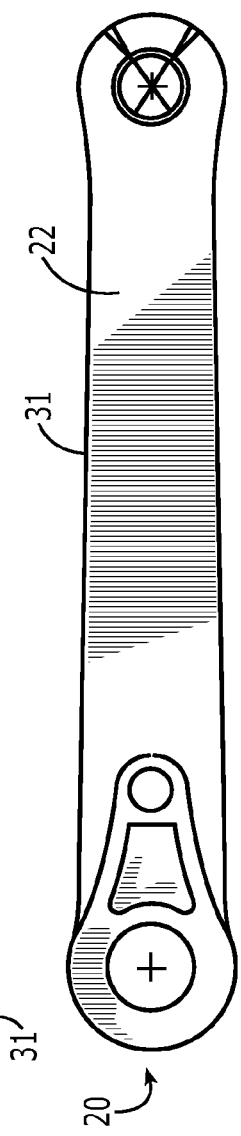

In a second crank 20 embodiment (FIGS. 12-19) the outside shell 21 is welded to the spine 22, which has built-in spindle 23 and crank 24 bosses protruding from a common, inner face 25 of an elongated, substantially planar member 26. Welding occurs at the circumferences of the boss apertures 27,28, as shown by the thickened lines 29,30 in FIGS. 12 and 13. The crank boss aperture 28 extends from the inner face 32 through to an outer face 33 at a first end 34 and is dimensioned to admit the crank boss 24. The spindle boss aperture 27 extends from the inner face 32 through to the outer face 33 at a second end 35 opposed to the first end 34 and is dimensioned to admit the spindle boss 23. Details of the spine 22 are shown in FIGS. 14-17. The built-in spindle 23 and crank 24 bosses reduce the welding area used in prior art crank arms (FIGS. 1 and 2). The assembled crank arm 20 is shown in FIGS. 18 and 19, wherein the welding area 31 comprises the thickened lines, substantially including the entire outer perimeter of FIG. 19.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A bicycle crank arm comprising:
    a spine comprising an elongated, planar member having a crank boss and a spindle boss at opposed ends of the planar member protruding from an inner face thereof, the crank boss and the spindle boss integrally formed with the elongated member and each comprising a cylindrical element having a threaded portion on an outer face thereof adjacent a distal end thereof, a lumen extending through each of the crank boss and the spindle boss, and through the spine from the inner face through to an outer face thereof;
    an outer body comprising an elongated member having an inner face having an outer perimeter with a shape coincident with an outer perimeter of the spine planar member, the inner face recessed and dimensioned to admit at least a portion of the spine and having a crank boss aperture extending from the inner face through to an outer face at a first end dimensioned to admit the crank boss and a spindle boss aperture extending from the inner face through to the outer face at a second end opposed to the first end dimensioned to admit the spindle boss;
    wherein the crank boss and the spindle boss each have an axial dimension longer than a respective axial dimension of the crank boss aperture and the spindle boss aperture, permitting a portion of each of the crank boss and the spindle boss to protrude beyond the crank boss aperture and spindle boss aperture when assembled together; and
    attachment means linking the outer body and the spine comprising means for securing the crank boss and the spindle boss to the outer body using the protruding portions, the securing means comprising a crank nut and a spindle nut dimensioned for screwing onto the respective threaded portions.

2. The bicycle crank arm recited in claim 1, wherein the spine comprises chromoly and the outer body comprises aluminum.

3. The bicycle crank arm recited in claim 1, wherein the spindle boss comprises a spline formed within spindle boss lumen.

4. The bicycle crank arm recited in claim 3, wherein the spline comprises a 48-tooth spline.

5. The bicycle crank arm recited in claim 1, wherein the attachment means further comprises a glue applied between the inner faces of the spine and the outer body.

6. The bicycle crank arm recited in claim 1, wherein the attachment means comprises a weld along at least a portion of distal ends of the crank boss aperture and the spindle boss aperture with a respective portion of distal ends of the crank boss and the spindle boss.

7. The bicycle crank arm recited in claim 6, wherein the attachment means further comprises a weld along at least a portion of the spine planar member outer perimeter and the outer body elongated member inner face.

* * * * *